United States Patent Office

2,968,649
Patented Jan. 17, 1961

2,968,649

ELASTOMERIC TERPOLYMERS

John R. Pailthorp, Wilmington, Del., and Herman Elbert Schroeder, Kennett Square, Pa., assignors to E. I. du Pont de Nemours and Company, Wilmington, Del., a corporation of Delaware No Drawing. Filed Dec. 4, 1958, Ser. No. 778,068

2 Claims. (Cl. 260—80.5)

This invention is directed to terpolymers formed by copolymerizing vinylidene fluoride, hexafluoropropene, and tetrafluoroethylene in certain ratios to give novel elastomers with improved physical and chemical properties as hereinafter described.

Copolymers containing 70 to 30% by weight of vinylidene fluoride and 30 to 70% of hexafluoropropene have been found to be elastomers of superior properties where resistance to high temperatures and attack by hydrocarbon solvents are important. Surprisingly, it has been discovered that by the introduction of tetrafluoroethylene into the polymer the elastomeric properties are retained although polytetrafluoroethylene is not elastomeric; the chemical stability of this terpolymer is significantly better than that of the copolymer in that there is a lessened tendency to split off hydrogen fluoride at elevated temperatures. Furthermore, the terpolymer retains its elastomeric properties longer when subjected to high temperatures.

It is an object of the present invention to provide novel terpolymers formed by copolymerizing vinylidene fluoride, hexafluoropropene, and tetrafluoroethylene, which terpolymers possess significant chemical and physical stability. It is a further object to the present invention to provide novel terpolymers possessing less tendency to split off hydrogen fluoride at elevated temperatures. It is still another object of the present invention to produce novel terpolymers which retain their elastomeric properties for a significantly longer period of time when subjected to high temperatures. These and other objects will become apparent in the following description and claims.

More specifically, the present invention is directed to an elastomeric terpolymer consisting of 3 to 35% by weight of tetrafluoroethylene units and 97 to 65% by weight of vinylidene fluoride and hexafluoropropene units present in a weight ratio between 2.33:1.0 and 0.667:1.0.

These novel terpolymers are made by copolymerization of a mixture of the monomers using well known polymerization conditions. Preferably the familiar aqueous redox polymerization system is used. Polymerization may be initiated by the use of the ammonium persulfate-sodium bisulfite system. Polymerization is normally accomplished under pressure at moderately elevated temperatures.

The composition of the terpolymer of the present invention is critical; the weight ratio of vinylidene fluoride ($VF_2$) to hexafluoropropene (HFP) corresponds to a range of 70 to 40% by weight of vinylidene fluoride and 30 to 60% by weight of hexafluoropropene monomer units. Within this ratio the terpolymer is elastomeric. When the proportion of HFP to $VF_2$ drops below about 30% the products are plastic rather than elastic. On the other hand about 60% is the largest proportion of HFP which yields a satisfactory elastic polymer. In the same vein, the content of tetrafluoroethylene (TFE) units should not exceed about 35% by weight of the total polymer if the elastomeric properties of the terpolymer are to be retained. When the weight percent of TFE in the terpolymer drops below about 3% the improved properties of the terpolymer are no longer significant.

The terpolymers of this invention are characterized by the following improvements over a simple copolymer of $VF_2$ and HFP:

(a) Lessened tendency to split out hydrogen fluoride at high temperatures. Elimination of HF at high temperatures in the copolymer causes embrittlement and loss of elastomeric properties. The HF evolved is corrosive, and, in one of the more important uses where the elastomer is laminated with glass fiber, this causes degradation of the fiber.

(b) When HF does split out of the terpolymer after prolonged exposure to high temperature, the elastomer retains its elastic properties and has a considerably less tendency to become brittle.

(c) The use of sodium fluoride lessens the tendency of the $VF_2$/HFP copolymer to split out HF. This effect is magnified several times when sodium fluoride is added to the terpolymer.

(d) The terpolymer is much more resistant to heat aging than is the $VF_2$/HFP copolymer. The elastomeric properties are retained for longer times at elevated temperatures.

(e) The tensile strength of the terpolymer containing the higher percentages of TFE is greater than that of the $VF_2$/HFP copolymer both originally and after heat aging.

(f) The terpolymer has improved resistance to fuming nitric acid.

(g) The terpolymer is cheaper on a weight basis since the TFE is cheaper than hexafluoropropene.

The terpolymer of this invention may be cured with the same curing agents by the same procedures as the $VF_2$/HFP copolymer. Suitable curing agents are hexamethylenediamine carbamate, benzoyl peroxide, high energy radiation, N,N'-arylidenediamines, aliphatic and cycloaliphatic diamines. An acid acceptor such as magnesium oxide, zinc oxide and disodium phosphate is used in combination with the curing agents.

The terpolymer may be compounded with reinforcing agents such as carbon black and silica. Pigments may be incorporated for color effects.

Conventional rubber compounding techniques are suitable for compounding the terpolymers. They readily band out on a cold rubber mill and compounding ingredients may be added on the mill in the usual way.

A preferred range of composition for the terpolymers of the present invention consists of 15 to 25% by weight of tetrafluoroethylene units and 85 to 75% by weight of vinylidene fluoride and hexafluoropropene units, the vinylidene fluoride and hexafluoropropene units being present in a weight ratio wit in the range of 2.33 to 1.0 to 0.667 to 1.0; within this range, the best technical balance of all of the heretofore described significant properties is achieved.

The following examples are representative and illustrate a continuous method operated as follows:

Gaseous vinylidene fluoride, hexafluoropropene and tetrafluoroethylene were measured through rotameters and then mixed in a pipe line. The mixed gases were compressed to approximately 900 lbs./sq. in. and led through a heated line (to prevent condensation) to the reactor which was a Type 316 stainless steel agitated autoclave with a free-space volume of 1435 cc. The catalyst solution was introduced into the autoclave through a separate line. The autoclave was operated liquid full and had a take-off line in the lid. The normal reaction temperature was 100±2° C. and the agitator operated at 574 r.p.m. The overflow from the autoclave passed through a pressure reducer which released the polymerization mass at atmospheric pressure. The polymer was coagulated and the aqueous catalyst phase was discarded. The raw polymer was sheeted out on a cold chrome-plated rubber mill and then heated on the mill to 100° C. to drive off any remaining water.

*Examples 1–3*

Using the continuous method described, three runs were made using the proportions of reactants shown in the following table:

| Example | 1 | 2 | 3 |
| --- | --- | --- | --- |
| Feed Composition,[1] Wt. Percent: | | | |
| Vinylidene fluoride | 59.0 | 49.1 | 36.0 |
| Hexafluoropropene | 37.6 | 33.2 | 32.5 |
| Tetrafluoroethylene | 3.4 | 17.7 | 31.5 |
| Temperature, °C | 98 | 102 | 101 |
| Pressure, Lbs./Sq. in. Gauge | 1,000 | 900–1,200 | 920 |
| Duration of Run, Hours | 3 | 1.5 | 1.25 |

[1] Determined by mass spectroscopy.

The same catalyst composition was used for all three examples and consisted of an aqueous solution containing 37.5 g. ammonium persulfate and 7.5 g. sodium bisulfite in 10,500 cc. of deionized water. The average feed rate of gases was 2.5–3.5 lbs. per hour and the catalyst solution was added at a rate of 2 liters per hour. The amount of off-gas from the reactor was negligible, indicating essentially complete polymerization of the monomer mixture so that the terpolymer contains monomer units in the ratio shown above.

The polymer was isolated as described above. 100 parts by weight of each polymer was compounded on a water-cooled rubber roll mill with 15 parts of magnesium oxide, 18 parts of medium thermal (MT) carbon black, and 1 part of hexamethylenediamine carbamate. The compounded stock was put in molds and cured in a press at 135° C. for 0.5 hour and then removed from the molds and placed in an oven for 1 hour at 100° C., then 1 hour at 140° C. and then at 204° C. for 24 hours to complete the cure.

The cured elastomeric polymers had the following stress-strain properties at room temperature:

| | Examples | | |
| --- | --- | --- | --- |
| | 1 | 2 | 3 |
| Tensile strength at break, lbs./sq. in | 1,740 | 1,930 | 3,180 |
| Elongation at break, percent | 235 | 250 | 255 |
| Modulus at 100% elongation, lbs./sq. in | 405 | 605 | 1,240 |

One of the improved properties exhibited by these terpolymers is resistance to loss of elastomeric properties on heat aging. This is particularly evident in the elongation of a sample at break. A copolymer of vinylidene fluoride and hexafluoropropene tends to become less elastic and more brittle.

A control sample was made by the above procedure which contained 64% by weight of vinylidene fluoride and 36% by weight of hexafluoropropene and compounded and cured in the same way as the terpolymers. Samples of all four elastomers were then held at 288° C. for 48 hours and then tested for elongation at the break at room temperature with the results shown below:

| | Elongation at break, percent | |
| --- | --- | --- |
| | Original | After Heat Aging |
| Example 1 | 235 | 180 |
| Example 2 | 250 | 385 |
| Example 3 | 255 | 340 |
| Control | 240 | 135 |

The terpolymers of this invention show a marked improvement in resistance to fuming nitric acid. Small strips of the cured elastomer of Example 2 and of the control were suspended in fuming nitric acid at room temperature for 7 days. At the end of this time the elastomer of Example 2 showed a weight increase of 18% while the control showed a weight increase of 97%.

Another improved property of these terpolymers is a decreased tendency to split out hydrogen fluoride at elevated temperatures. While the addition of a small amount of sodium fluoride improves the copolymer of vinylidene fluoride and hexafluoropropene, the terpolymers are improved even more. This effect may be shown by placing 0.5 gram of the uncompounded polymer in a glass tube about 150 mm. long and 18 mm. in diameter and having 2 mm. thick walls and sealing it off under vacuum less than 1 mm. of mercury. The tube is then placed in a furnace at 288° C. and the time necessary for the glass to become etched is noted. Samples of the above control copolymer and the three terpolymers and samples which had been compounded on a rubber roll mill with 2% sodium fluoride were so tested with the results shown in the following table:

| | HF Elimination, Hours to Etching | | |
| --- | --- | --- | --- |
| | None | Slight | Considerable |
| Example 1 | | 2 | 7 |
| Example 2 | 5 | 7 | 19 |
| Example 3 | 6 | 7 | 52 |
| Control | | 2 | 5 |
| With 2% NaF Added: | | | |
| Example 1 | | 43 | 51 |
| Example 2 | 136 | 160 | 280 |
| Example 3 | >500 | | |
| Control | | | 43 |

It is readily apparent that a marked decrease in the elimination of HF occurs as the percentage of tetrafluoroethylene in the copolymer is increased.

One of the uses of this type of elastomer is for fuel cells for aircraft. For this purpose the elastomer is used as a laminate with glass fiber. Laminates of two layers of glass fiber which had been coated on each side were prepared from the polymers of Examples 2 and 3 and the control polymer by first compounding 100 parts by weight of each polymer with 15 parts of magnesium oxide, 20 parts of high modulus furnace black and 1 part of hexamethylenediamine carbamate on a cold rubber mill. 130 g. of the compounded stock was dispersed in 520 g. of methyl ethyl ketone. This was coated on 6 x 6 inch squares of woven glass fabric first on one side and then the other after the first side was dry. The thickness of the dry coat was 5 mils. One side of each of two squares was then given an additional coat and while still tacky, the sides were placed together and rolled to remove air. The assembly was put in an oven for 1 hour at 100° C., 1 hour at 140° C. and then the cure was completed by heating in an oven at 204° C. for 24 hours.

The laminates were tested by cutting 1 x 6 inch strips from the laminates and putting them in an oven at 288° C. and the embrittlement and weight loss was determined over a period of time. The following table shows the comparison of the samples.

| | Percent Weight Loss After Hours at 288° C. | | |
| --- | --- | --- | --- |
| | 12 | 48 | 90 |
| Example 2 | 4.0 (F) | 11 (F) | 19 (B) |
| Example 3 | 3.9 (F) | 10 (F) | 18 (SB) |
| Control | 19 (B) | | |

(F) = flexible; (SB) = slightly brittle; (B) = brittle.

It is thus evident that the laminates from Examples 2 and 3 after 90 hours were equal to or better than the control after only 12 hours.

Example 4

The terpolymer of Example 2 was compounded on a cold rubber roll mill as follows, parts being by weight:

|  | Parts |
|---|---|
| Terpolymer | 100 |
| Zinc oxide | 10 |
| Disodium phosphate | 10 |
| Silica (Hi Sil 233) | 16 |
| Silicone oil (LM-3) | 4 |
| Benzoyl peroxide | 2 |
| m-Phenylene bismaleimide | 2 |

The compounded stock was heated in molds in a press at 135° C. for 0.5 hour and then removed from the mold and heated in an oven at 100° C. for 1 hour, then 140° C. for 1 hour and the cure completed by heating at 204° C. for 24 hours. Samples were heat aged at 288° C. for 48 hours and then tested at room temperature for stress-strain properties. The results are shown in the following table.

|  | Original | After Heat Aging |
|---|---|---|
| Tensile strength at break, lbs./sq. in | 2,500 | 810 |
| Elongation at break, percent | 575 | 470 |
| Modulus at 100% elongation, lbs./sq. in | 395 | 380 |

Example 5

Into a 400 cc. stainless steel bomb was placed a freshly prepared solution of 1.08 g. of ammonium persulfate and 0.20 g. of sodium bisulfite in 200 g. of deoxygenated deionized water. The contents were frozen and the bomb closed and evacuated. There was then charged into the bomb, 27 g. of vinylidene fluoride, 63 g. of hexafluoropropene, and 10 g. of tetrafluoroethylene. The bomb was closed again, placed in a shaker and heated to 100° C. and shaken at that temperature for 3 hours 50 minutes. The maximum pressure was 700 lbs./sq. in. gauge. The bomb was then cooled and vented. The amount of residual monomers was 41 g. The coagulated polymer was removed, placed in a Waring Blendor and washed with water until free of acid, and then dried in a vacuum oven at 50° C. The off-gas analyzed by mass spectroscopy showed 79.8 mole percent hexafluoropropene, 9.1 mole percent tetrafluoroethylene and 6.5 mole percent vinylidene fluoride. The terpolymer is then calculated to consist of 44% by weight of vinylidene fluoride, 44% hexafluoropropene and 12% tetrafluoroethylene units.

100 parts of the polymer was compounded on a rubber roll mill with 15 parts of magnesium oxide, 18 parts of medium thermal carbon black, and 1 part of hexamethylenediamine carbamate. The compounded stock was put in molds in a press and heated at 135° C. for 0.5 hour, removed from the molds and heated in an oven at 100° C. for 1 hour and then at 140° C. for 1 hour and then at 204° C. for 24 hours. Samples were then heat aged at 288° C. for 48 hours and their stress-strain properties determined at room temperature. The stress-strain values of the original and heat-aged stock are shown below:

|  | Original | After Heat Aging |
|---|---|---|
| Tensile strength at break, lbs./sq. in | 1,890 | 505 |
| Elongation at break, percent | 260 | 400 |
| Modulus at 100% elongation, lbs./sq. in | 500 | 300 |

Example 6

Into a 400 cc. stainless steel bomb was placed 200 g. of deionized, deoxygenated water and 0.25 g. of ammonium persulfate and 0.05 g. of sodium bisulfite. The bomb was then cooled to freeze the water and then closed and evacuated. There was then added 90 g. of hexafluoropropene, 15 g. of vinylidene fluoride and 10 g. of tetrafluoroethylene. The bomb was closed and heated in a shaker to 120° C. in 30 minutes and held at that temperature for 1.5 hours. The bomb was cooled to room temperature and the unreacted gas was vented into a cold steel bomb receiver. The unreacted gas weighed 85 g. and 226 g. of a clear emulsion of the product was removed from the reaction bomb. This emulsion was coagulated by adding 5 g. of sodium chloride to it in a Waring Blendor. The precipitated polymer was washed three times with 200 cc. portions of deionized water on a filter and sucked as dry as possible. It was then put on a cold rubber roll mill and milled to squeeze out water and finally dried by heating the roll mill to 110° C. The yield was 29 g. of a product having an intrinsic viscosity of 0.80.

The unreacted gas mixture was analyzed by vapor phase chromatographic analysis and gave the following results:

|  | Mole percent |
|---|---|
| Hexafluoropropene | 84.4 |
| Vinylidene fluoride | 8.7 |
| Tetrafluoroethylene | 6.8 |

This corresponds to a polymer composition by weight of 42.0% hexafluoropropene, 38.7% vinylidene fluoride and 19.3% tetrafluoroethylene. This is confirmed by a carbon analysis of 29.6% (theory 29.2%). (The weight ratio of vinylidene fluoride to hexafluoropropene is 0.92.)

100 parts of the polymer was compounded on a rubber roll mill with 15 parts of magnesium oxide, 18 parts of medium thermal carbon black and 1 part of hexamethylenediamine carbamate. The stock was put in a mold in a press and heated for 30 minutes at 135° C. It was then removed from the mold and heated in an oven for 1 hour at 100° C., 1 hour at 140° C. and then 24 hours at 204° C. The resulting smooth black slab had excellent mold definition and had the following properties:

| Tensile strength at break, lbs. per sq. in | 2220 |
|---|---|
| Modulus at 100% elongation, lbs. per sq. in | 245 |
| Elongation at break, percent | 330 |

From the preceding specification, together with specific representative Examples 1–6, it is clear that a significant contribution has been made in the field of vinylidene fluoride polymer chemistry. The described terpolymer produced according to the present invention reflects surprising chemical stability together with significant retention of elastomeric properties when subjected to high temperatures for long periods of time.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. An elastomeric terpolymer consisting of 3 to 35% by weight of tetrafluoroethylene units and 97 to 65% by weight of vinylidene fluoride and hexafluoropropene units, said vinylidene fluoride and hexafluoropropene units being present in a weight ratio within the range of 2.33:1.0 to 0.667:1.0.

2. An elastomeric terpolymer consisting of 15 to 25% by weight of tetrafluoroethylene units and 85 to 75% by weight of vinylidene fluoride and hexafluoropropene units, said vinylidene fluoride and hexafluoropropene units being present in a weight ratio within the range of 2.33:1.0 to 0.667:1.0.

References Cited in the file of this patent

UNITED STATES PATENTS

| 2,751,376 | Barnhart et al. | June 19, 1956 |
|---|---|---|
| 2,888,446 | Herbst et al. | May 26, 1959 |